United States Patent
Bevilacqua et al.

(10) Patent No.: US 9,525,479 B2
(45) Date of Patent: Dec. 20, 2016

(54) APPARATUS AND METHOD FOR OPTIMIZING THE RECONFIGURATION OF AN OPTICAL NETWORK

(75) Inventors: Michela Bevilacqua, Genoa (IT); Massimiliano Maggiari, Genoa (IT); Carla Marcenaro, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 83 days.

(21) Appl. No.: 14/373,351

(22) PCT Filed: Jan. 24, 2012

(86) PCT No.: PCT/EP2012/051007
§ 371 (c)(1),
(2), (4) Date: Jul. 19, 2014

(87) PCT Pub. No.: WO2013/110320
PCT Pub. Date: Aug. 1, 2013

(65) Prior Publication Data
US 2015/0215032 A1    Jul. 30, 2015

(51) Int. Cl.
*H04J 14/00* (2006.01)
*H04B 10/032* (2013.01)
(Continued)

(52) U.S. Cl.
CPC .......... *H04B 10/032* (2013.01); *H04B 10/075* (2013.01); *H04B 10/27* (2013.01);
(Continued)

(58) Field of Classification Search
CPC ..... H04B 10/032; H04B 10/27; H04B 10/075; H04L 41/12; H04L 45/127; H04L 45/62; H04J 14/0267; H04J 14/0295; H04J 14/0291; H04J 2203/006; H04J 3/14; H04J 3/1652
See application file for complete search history.

(56) References Cited

U.S. PATENT DOCUMENTS 5,263,035 A * 11/1993 Leboutet ............... H01S 3/0903
372/2
5,594,747 A * 1/1997 Ball ........................ H01S 3/067
372/102
(Continued)

FOREIGN PATENT DOCUMENTS

CN    1571522 A    1/2005
CN    1698312 A    11/2005
(Continued)

OTHER PUBLICATIONS

PCT International Search Report, mailed Oct. 31, 2012, in connection with International Application No. PCT/EP2012/051007, all pages.
(Continued)

*Primary Examiner* — Danny Leung
(74) *Attorney, Agent, or Firm* — Leffler Intellectual Property Law, PLLC (57) ABSTRACT

There is provided a method for optimizing the configuration of an optical network which is adapted to transport optical traffic along a path from a source node to a destination node, wherein the path can be routed via any one or more of a plurality of intermediate nodes in the optical network. The method comprises the steps of receiving an operating parameter of an optical device monitored in a plurality of nodes. The received operating parameter is compared with a threshold value. An operating status of a node is determined based on the comparison of the received operating parameter with the threshold value. The determined operating status of a node is used as a routing criteria for computing a path for routing traffic through the optical network.

14 Claims, 5 Drawing Sheets

(51) Int. Cl.

| | |
|---|---|
| *H04B 10/075* | (2013.01) |
| *H04L 12/721* | (2013.01) |
| *H04J 14/02* | (2006.01) |
| *H04B 10/27* | (2013.01) |
| *H04L 12/24* | (2006.01) |
| *H04J 3/14* | (2006.01) |
| *H04J 3/16* | (2006.01) |

(52) U.S. Cl.
CPC ...... *H04J 14/0267* (2013.01); *H04J 14/0295* (2013.01); *H04L 41/12* (2013.01); *H04L 45/127* (2013.01); *H04L 45/62* (2013.01); *H04J 3/14* (2013.01); *H04J 3/1652* (2013.01); *H04J 14/0291* (2013.01); *H04J 2203/006* (2013.01)

(56) References Cited

U.S. PATENT DOCUMENTS

| | | | | |
|---|---|---|---|---|
| 6,115,154 | A * | 9/2000 | Antoniades | H04B 10/032 356/73.1 |
| 6,421,149 | B2 * | 7/2002 | Tervonen | H04B 10/07955 398/140 |
| 6,567,432 | B1 * | 5/2003 | Kim | H01S 3/067 372/20 |
| 6,914,879 | B1 * | 7/2005 | Kleine-Altekamp | H04J 3/1611 370/219 |
| 7,113,699 | B1 * | 9/2006 | Bhate | H04B 10/07953 370/222 |
| 7,274,869 | B1 | 9/2007 | Pan | |
| 2002/0163682 | A1 | 11/2002 | Su et al. | |
| 2002/0191245 | A1 * | 12/2002 | Fang | H04J 14/0201 398/3 |
| 2002/0191247 | A1 * | 12/2002 | Lu | H04B 10/03 398/79 |
| 2003/0091267 | A1 * | 5/2003 | Alvarez | H04Q 11/0005 385/16 |
| 2004/0131353 | A1 * | 7/2004 | Cannon | H04B 10/296 398/1 |
| 2005/0053374 | A1 * | 3/2005 | Hubendick | H04B 10/079 398/50 |
| 2007/0154219 | A1 * | 7/2007 | Feinberg | H04J 14/0227 398/104 |
| 2007/0242689 | A1 * | 10/2007 | Zavadsky | H04L 1/24 370/464 |
| 2007/0291727 | A1 * | 12/2007 | Hellum | G06F 8/67 370/345 |
| 2008/0192626 | A1 * | 8/2008 | Yang | H04L 12/5695 370/225 |
| 2009/0269053 | A1 * | 10/2009 | Yang | H04B 10/0791 398/22 |
| 2010/0104282 | A1 * | 4/2010 | Khan | H04J 3/14 398/45 |
| 2010/0150546 | A1 * | 6/2010 | Shrikhande | H04J 3/14 398/10 |
| 2011/0075584 | A1 * | 3/2011 | Teramoto | H04L 12/437 370/252 |
| 2011/0262786 | A1 * | 10/2011 | Fuse | H01M 6/505 429/90 |
| 2012/0219024 | A1 * | 8/2012 | Okamoto | H01S 5/0687 372/20 |
| 2013/0010612 | A1 | 1/2013 | Lee et al. | |
| 2013/0343179 | A1 * | 12/2013 | Madaiah | H04L 12/437 370/222 |
| 2015/0215032 | A1 * | 7/2015 | Bevilacqua | H04J 14/0267 398/5 |

FOREIGN PATENT DOCUMENTS

| | | |
|---|---|---|
| CN | 100411349 C | 8/2008 |
| CN | 101296034 A | 10/2008 |
| CN | 101409646 A | 4/2009 |
| CN | 101800913 A | 8/2010 |
| CN | 101848035 A | 9/2010 |
| CN | 102185650 A | 9/2011 |
| EP | 0 851 616 A1 | 7/1998 |
| EP | 1 161 014 A1 | 12/2001 |

OTHER PUBLICATIONS

Lee et al. "A Framework for the Control of Wavelength Switched Optical Networks (WSON) with Impairments" Internet Draft, Jan. 5, 2012, IEFT Trust, pp. 1-31.

Okamoto, S. "Requirements of GMPLS Extensions for Energy Efficient Traffic Engineering" Internet Draft, Jun. 27, 2001, IETF Trust, pp. 1-6.

ITU-T Standard G.709/Y.1331 "Interfaces for the Optical Transport Network (OTN)" Dec. 2009, pp. 1-218.

Yonezu, Haruka et al. "QoS Aware Energy Optimal Network Topology Design and Dynamic Link Power Management" ECOC 2010, Sep. 19-23, 2010, Torino, Italy, IEEE, pp. 1-3.

Takeshita, Hidetoshi et al. "Demonstration of the Self Organized Dynamic Link Power Management by 'MiDORi' Energy Optimal Network Topology Design Engine" OSA/OFC/NFOEC 2011, pp. 1-3.

Jirattigalachote, Amomrat et al. "Dynamic provisioning strategies for energy efficient WDM networks with dedicated path protection" Optical Switching and Networking 8 (2011) pp. 201-213, Elsevier B.V.

MiDORi Research Background, Keio University Yamanaka Lab, 7th International Conference on IP+Optical Network (IPOP 2011), Jun. 2-3, 2011, NEC Tamagawa Plant, Kawasaki, Kanagawa, Japan, pp. 1-5.

Chinese Search Report, dated Nov. 24, 2015, in connection with Chinese Application No. 201280067968.5, all pages.

English language translation of Chinese Search Report, dated Nov. 24, 2015, in connection with Chinese Application No. 201280067968.5, all pages.

Chinese Office Action issued Jul. 28, 2016 in connection with Chinese Application No. 201280067968.5, all pages.

English translation of Chinese Office Action issued Jul. 28, 2016 in connection with Chinese Application No. 201280067968.5, all pages.

Supplementary Chinese Search Report issued Jul. 28, 2016 in connection with Chinese Application No. 201280067968.5, all pages.

English translation of Supplementary Chinese Search Report issued Jul. 28, 2016 in connection with Chinese Application No. 201280067968.5, all pages.

* cited by examiner

APPARATUS AND METHOD FOR OPTIMIZING THE RECONFIGURATION OF AN OPTICAL NETWORK

TECHNICAL FIELD

The present invention relates to an apparatus and method for optimizing the reconfiguration of an optical network, for example when providing protection path switching in an optical network.

BACKGROUND

The Optical Transport Network (OTN) is defined by a series of recommendations or standards coordinated by the International Telecommunication Union (ITU). ITU-T Recommendation G.873.1 defines the Automatic Protection Switching (APS) protocol and protection switching operation for the linear protection schemes of the Optical Transport Network at the Optical Channel Data Unit (ODUk) level.

In a linear protection architecture of an optical transport network, protection switching schemes may be generally classified as:

trail protection (at a section or path layer);
sub-network connection protection (which in turn comprises inherent monitoring, non-intrusive monitoring, and sub-layer trail monitoring)

Sub-network connection protection switching in optical transport networks are further defined in ITU-T Recommendation G.798.

In an optical network, such as a Dense Wavelength Division Multiplexing (DWDM) network, end-to-end protection schemes are offered to customers as Optical Sub-Network Connection Protection (OSNCP), as well as in a Wavelength Switched Optical Network scenario. Further protection schemes based on pre-planned paths can also be defined, such as Safe OSNCP or Transponder Sharing Protection schemes.

Figure 1:
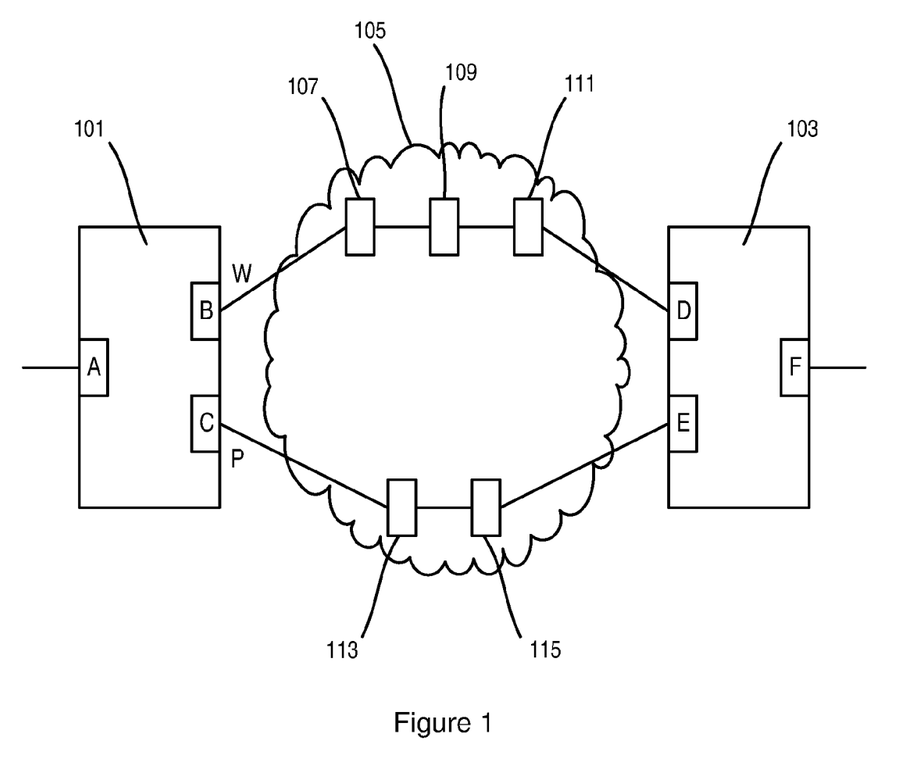
FIG. 1 shows an example of a typical optical transport network.

FIG. 1 shows an optical network comprising a first node 101, for example a ODUk cross connect node, communicating with a second node 103, for example a ODUk cross connect node, via an optical transport network 105. The first node 101 is shown as comprising an input interface A (for example a traffic card), and first and second output interfaces (or traffic cards) B and C. The second node 103 is shown as comprising first and second input interfaces D and E, and an output interface F. Protection switching in such a network is provided by duplicating an ODUk transmission over two independent paths along the optical transport network. Traffic may be transmitted along the path B→D, which is named the "working path" (W), with a duplicate transmission along the path C→E, which is named the "protecting path" (P). The destination node, or second node 103, will select the traffic (i.e. ODUk traffic) from either the working path W or from the protecting path P depending on quality information. For example, traffic may be selected according to Signal Fail (SF) and Signal Degrade (SD) information detected by the second node 103 at interfaces D and E which receive the working path W and protecting path P traffic, respectively.

In the optical communication networks such as those shown in FIG. 1, since an optical signal is attenuated along a transmission path, it is necessary to amplify an optical signal along its routing path using intermediate nodes, such as optical amplifier devices, transponders or regenerators. For example, in FIG. 1 intermediate nodes 107, 109, 111 are shown in the working path W, and intermediate nodes 113, 115 shown in the protection path P. As such, intermediate nodes in the form of optical amplifier devices, transponders or optical-electrical-optical (OEO) regenerators (also known as 3R regenerators) are used to increase the power of a signal in order to reach a distant node, which can be located a long distance from the source node.

Optical amplifier units are also used on an optical multiplexed section which aggregates a number of optical channel signals, and transporting on an Optical Transport Section (OTS) according to the ITU-T G709 standard.

The optical transport network of FIG. 1 shows a particular route for a working path W and a particular route for the protection path P through the optical transport network 5. It will be appreciated that the working path W and protection path P can be configured to take any route through the optical transport network 5, for example using any combination of a plurality of nodes (not all shown in FIG. 1), the route being determined by a network management system or layer (also not shown).

A disadvantage of existing protection schemes is that the performance of the network in terms of the performance of individual devices involved in the paths is not taken into consideration in the switching criteria of the protection mechanisms. In other words, path protection mechanisms in a DWDM network or WSON based network do not take into consideration the real status of the physical resources involved in the paths.

SUMMARY

It is an aim of the present invention to provide a method and apparatus which obviate or reduce at least one or more of the disadvantages mentioned above.

According to a first aspect of the present invention, there is provided a method for optimizing the configuration of an optical network which is adapted to transport optical traffic along a path from a source node to a destination node, wherein the path can be routed via any one or more of a plurality of intermediate nodes in the optical network. The method comprises the steps of: receiving an operating parameter of an optical device monitored in a plurality of nodes; comparing the received operating parameter with a threshold value; determining an operating status of a node based on the comparison of the received operating parameter with the threshold value; and using the determined operating status of a node as a routing criteria for computing a path for routing traffic through the optical network.

According to another aspect of the present invention, there is provided a path computation engine for an optical network. The path computation engine comprises a receiving unit for receiving a plurality of operating parameters relating to optical devices in nodes of the optical network. The path computation engine also comprises a processing unit adapted to: compare the received operating parameters with respective threshold values; determine an operating status of a node based on the comparison of the operating parameters with the respective threshold values; and compute a path for routing traffic through the optical network based on the determined operating status of the nodes.

According to another aspect of the present invention, there is provided a node of an optical network, for use with a method for optimizing the configuration of an optical network which is adapted to transport optical traffic along a path from a source node to a destination node as claimed in the appended claims. The node comprises: an optical device; a monitoring module for monitoring an operating parameter of the optical device; and a transmitting module for transmitting the monitored operating parameter to a remote node, for use in optimizing the configuration of the optical network.

According to another aspect of the present invention, there is provided a network management node for an optical network comprising a plurality of nodes. The network management node comprises: a receiving unit for receiving a plurality of operating parameters relating to optical devices in the plurality of nodes. The network management node also comprises a processing unit adapted to: compare the received operating parameters with respective threshold values; determine the operating status of the plurality of nodes based on the comparison of the operating parameters with the respective threshold values; and configure the optical network based on the determined operating status of the nodes.

The embodiments of the invention have the advantage of enabling the operating status of optical devices to be taken into consideration during the computation of routing paths through the network, or during reconfiguration of a network.

The embodiments of the invention also have the advantage of enabling users to help reduce or optimize the power consumption of their networks. For example, by avoiding the use of network devices which have aged, and which are consuming more power as a consequence.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

The embodiments of the invention are described below in connection with an optical network of the type known as a Dense Wavelength Division Multiplexing (DWDM) network. It is noted, however, that the embodiments of the invention are intended to be used with any form of optical network.

The embodiments of the present invention monitor or collect one or more useful parameters relating to the performance of optical devices in nodes of the network. The performance parameters can be used as the trigger for reconfiguring a network or a trigger for computing a new path through the network. The reconfiguration or path computing may be performed either automatically or semi-automatically, as will be described further below.

Figure 2:
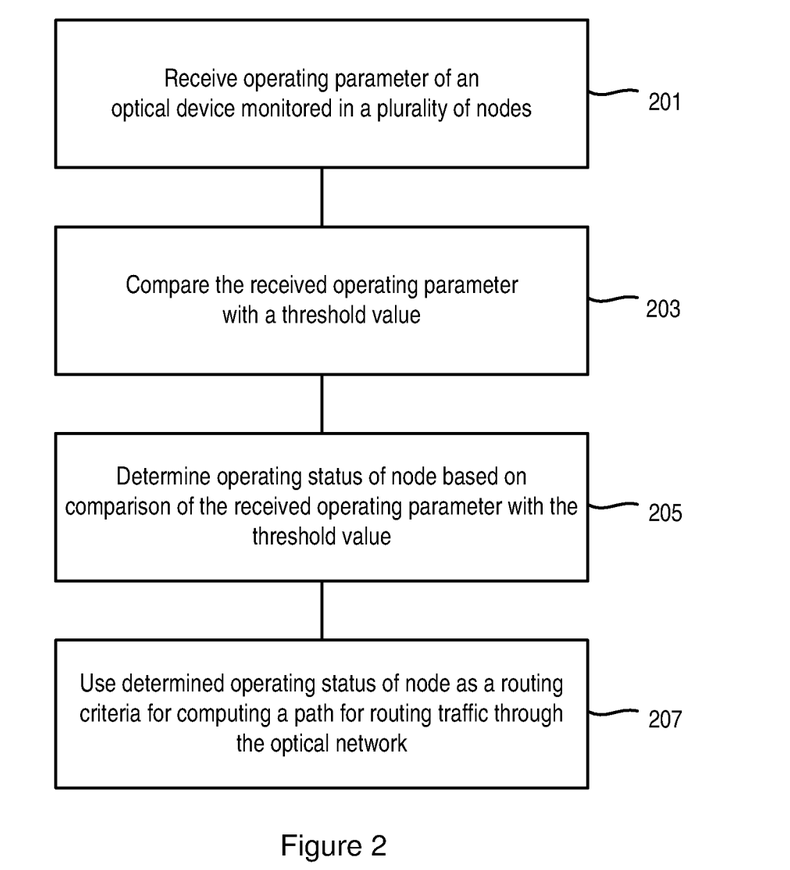
FIG. 2 shows the steps performed by a method according to a first embodiment of the present invention.

FIG. 2 illustrates the steps performed by an embodiment of the present invention, and relates to a method for optimizing the configuration of an optical network which is adapted to transport optical traffic along a path from a source node to a destination node, wherein the path can be routed via any one or more of a plurality of intermediate nodes in the optical network. In step 201 an operating parameter of an optical device monitored in a plurality of nodes is received. It is noted that more than one operating parameter may be received for each optical device, if desired (for example by monitoring more than one operating parameter in each node). The plurality of nodes may include any combination of source nodes, intermediate nodes and destination nodes. The optical device may comprise a laser device, for example. It is noted that other optical devices may be the subject of performance monitoring. The optical device may comprise part of an amplifier or transponder. For example, in FIG. 1 amplifiers found in the traffic cards B, C, D, E may be monitored, or amplifiers found in transponders (3R regeneration transponders) used in the intermediate nodes (107, 109, 111, 113, 115), or end nodes where ODUx paths are terminated, for example traffic cards A and F of FIG. 1.

The received operating parameter is compared with a threshold value, step 203. In step 205 an operating status of a node is determined based on the comparison of the received operating parameter with the threshold value. The determined operating status of a node is then used as a routing criteria for computing a path for routing traffic through the optical network, step 207.

For a laser device, for example, the operating parameter may comprise any one or more of the following: a bias current of the laser device; a temperature of the laser device; the power consumption of the laser device; the peak current used by the laser device; or the average current used by the laser device. It is noted that the embodiments of the invention are not limited to these measurements or drive values, and that other performance measurements relating to other operating parameters of an optical device may also be used.

It is also noted that more than one operating parameter may be monitored or collected for a particular optical device, such that more than one operating parameter may be received and compared with respective thresholds.

According to one embodiment, the performance of a laser device used by network devices in a DWDM network is used as a measure of the performance of devices involved in the DWDM networks. For example, if the power consumption of a laser device is used as the operating parameter being monitored, the power consumption is compared with a threshold value. The threshold value may correspond to an expected power consumption for that laser device, or a power consumption which is deemed to be an acceptable level. Therefore, if a laser device uses more power as it becomes less efficient with age, this can be detected as a change in the operating status of the laser device, and used to trigger a different path to be used, or the network to be reconfigured such that it does not use that node, or that particular laser device within a particular node. This may involve an entire node being shut-down if a faulty laser device is detected, or just part of a node that comprises the faulty laser device.

The performance of an amplifier unit, transponder or regeneration node can therefore be used to monitor the status of a network, such as a (DWDM) network.

In a DWDM network, optical transport sections (OTS) and optical multiplex sections (OMS) are shared, such that more optical channels can be provided, therefore enabling multiplexed lines to be monitored when transporting an optical channel (OCH).

The monitoring of amplifier units, transponders, regenerators, optical supervisory units (or other nodes having optical devices) used for transporting an optical channel enable the performance of the network to be verified, thereby providing useful information for all of the paths sharing the same amplifier units, transponders, regenerators, etc.

The embodiments of the invention also have the advantage of enabling users to help reduce or optimize the power consumption of their networks, for example by avoiding the use of network devices which have aged, and which are consuming more power as a consequence. In other words, the embodiments provide a solution to re-optimize a network in the presence of aged amplifier units, transponders or regenerators.

According to one embodiment the steps of monitoring an operating parameter of an optical device in a node, and/or receiving and comparing the operating parameter with a threshold value are performed periodically in order to detect a change in the operating status of a node.

The detection of a change in the operating status of a node can be used to trigger a reconfiguration of a path in the optical network.

Alternatively, a change in operating status may comprise the step of triggering a node to be removed from the optical network, or both. A change in the operating status can be used for reconfiguring the optical network.

The steps of triggering a reconfiguration, removing a node, or an optical device in a node, or reconfiguring the optical network can be performed either automatically or semi-automatically (in which case some user or operator involvement is required or preferred).

The embodiments of the invention therefore enable the monitoring of the optical parameters of a number of devices (such as amplifier, transponder or regenerator units) in order to verify their performance over time. When used for a long time, the performance of these units can decrease, and this degradation is traced by the optical performances.

Threshold values for optical parameters can be defined and used in order that when overcome, they can trigger consequent actions. It is noted that as an alternative to having just one threshold value, an operating parameter may have several threshold values, such that different actions can be taken depending upon which threshold value is crossed. For example, crossing a "higher" threshold can be used to trigger a node to be removed from the network, whereas crossing a "lower" threshold could be used to trigger a less severe change, such as the node being listed as a non-preferred node which is only used when network demand is high. As such, different actions can be taken depending upon how much a laser device has aged, for example.

Figure 3:
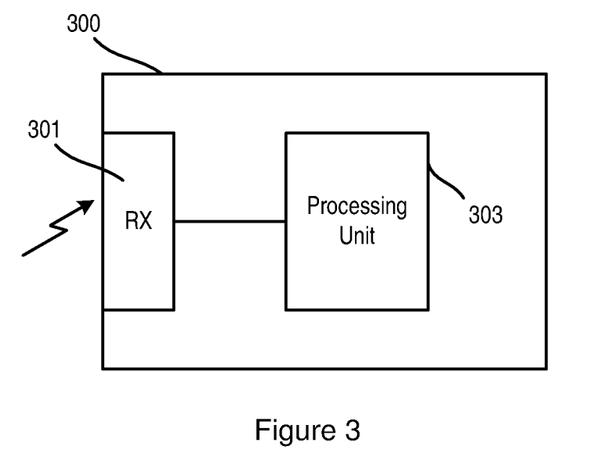
FIG. 3 shows a path computation engine according to an embodiment of the present invention.

FIG. 3 shows a path computation engine 300 for an optical network, according to an embodiment of the present invention. The path computation engine 300 comprises a receiving unit 301 for receiving a plurality of operating parameters relating to optical devices in nodes of the optical network. As mentioned above, in one embodiment an operating parameter can relate to performance measurements of a laser device. The path computation engine 300 also comprises a processing unit 303. The processing unit 303 is adapted to compare the received operating parameters with respective threshold values. The processing unit 303 is adapted to determine an operating status of a node based on the comparison of an operating parameter with a respective threshold value. The processing unit 303 computes a path for routing traffic through the optical network based on the determined operating status of the nodes.

The path computation engine 300 may be realised as a centralized path computation engine adapted to re-optimize the end-to-end paths of a DWDM network. For example, a centralized path computation engine can be configured to:

Define an alternative path for an unprotected path.
Define a new protected/protecting path for an optical sub-network connection protection (OSNCP) path,
Define new pre-planned paths for wavelength switched optical network (WSON) protected paths.

A list of nodes that have crossed specific thresholds can be held, for example nodes which are thereby deemed to have become inefficient through aging. The path computation engine can be configured such that it does not involve in any new paths any nodes which are included on such a list of nodes that have crossed defined threshold values.

Figure 4:
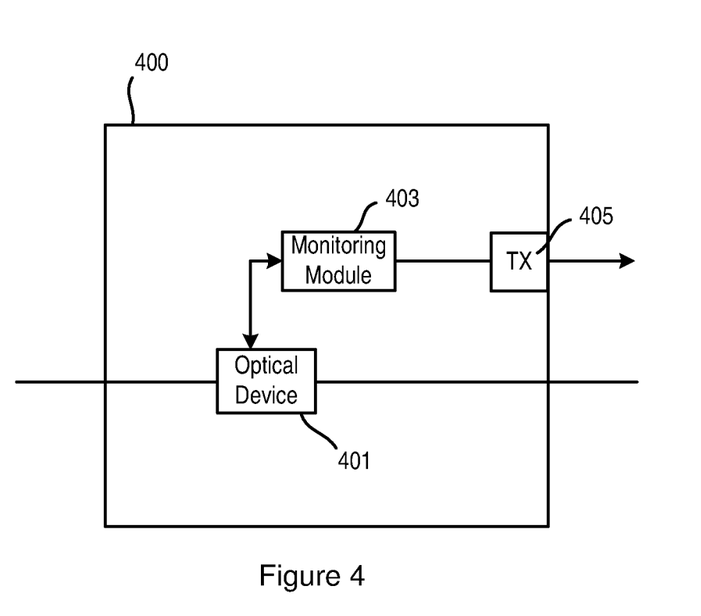
FIG. 4 shows a node of an optical network according to an embodiment of the present invention.

FIG. 4 shows a node 400 of an optical network, for use with a method for optimizing the configuration of an optical network which is adapted to transport optical traffic along a path from a source node to a destination node as described above. The node comprises an optical device 401. For example, the optical device may comprise a laser device forming part of an optical amplifier, transponder, multiplexer or regenerator. A monitoring module 403 monitors an operating parameter of the optical device 401. It is noted that the monitoring module may be adapted to monitor one or more operating parameters. A transmitting module 405 transmits the monitored operating parameter (or parameters) to a remote node, for use in optimizing the configuration of the optical network. For example, the monitored parameters may be transmitted to a path computation engine or a network management system or node.

Figure 5:
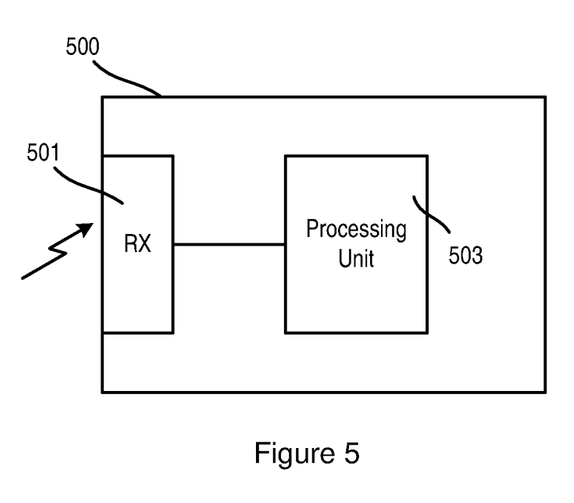
FIG. 5 shows a network management node according to an embodiment of the present invention.

FIG. 5 shows a network management node 500 according to an embodiment of the invention, for use with an optical network comprising a plurality of nodes. The network management node 500 comprises a receiving unit 501 for receiving a plurality of operating parameters relating to optical devices in the plurality of nodes, for example operating parameters relating to a laser device. A processing unit 503 is adapted to compare the received operating parameters with respective threshold values. The processing unit 503 is also adapted to determine the operating status of the plurality of nodes based on the comparison of the operating parameters with the respective threshold values, and to configure the optical network based on the determined operating status of the nodes.

According to one embodiment, the network management node 500 may be further adapted to shutdown a particular node if it is determined that the operating status of a particular node is such that it is causing an inefficient use of power, or having some other degrading effect on the network.

The network management node 500 may be configured to shutdown a node immediately, or alternatively wait until the existing traffic being routed through that node has ceased. In a multi-threshold embodiment, which option to take can depend on which threshold has been crossed.

Automatic operation (or semi-automatic operation constrained to operator selection) can be defined to automatically update or reconfigure a live network (or after an operator selection for a semi-automatic option).

If an automatic approach has been selected, the new computed paths can be automatically activated. If a semi-automatic approach has been selected, the threshold value crossing and new computed path(s) can be notified to an operator, who can then choose if and when to activate the new path(s) in the network.

Figure 6:
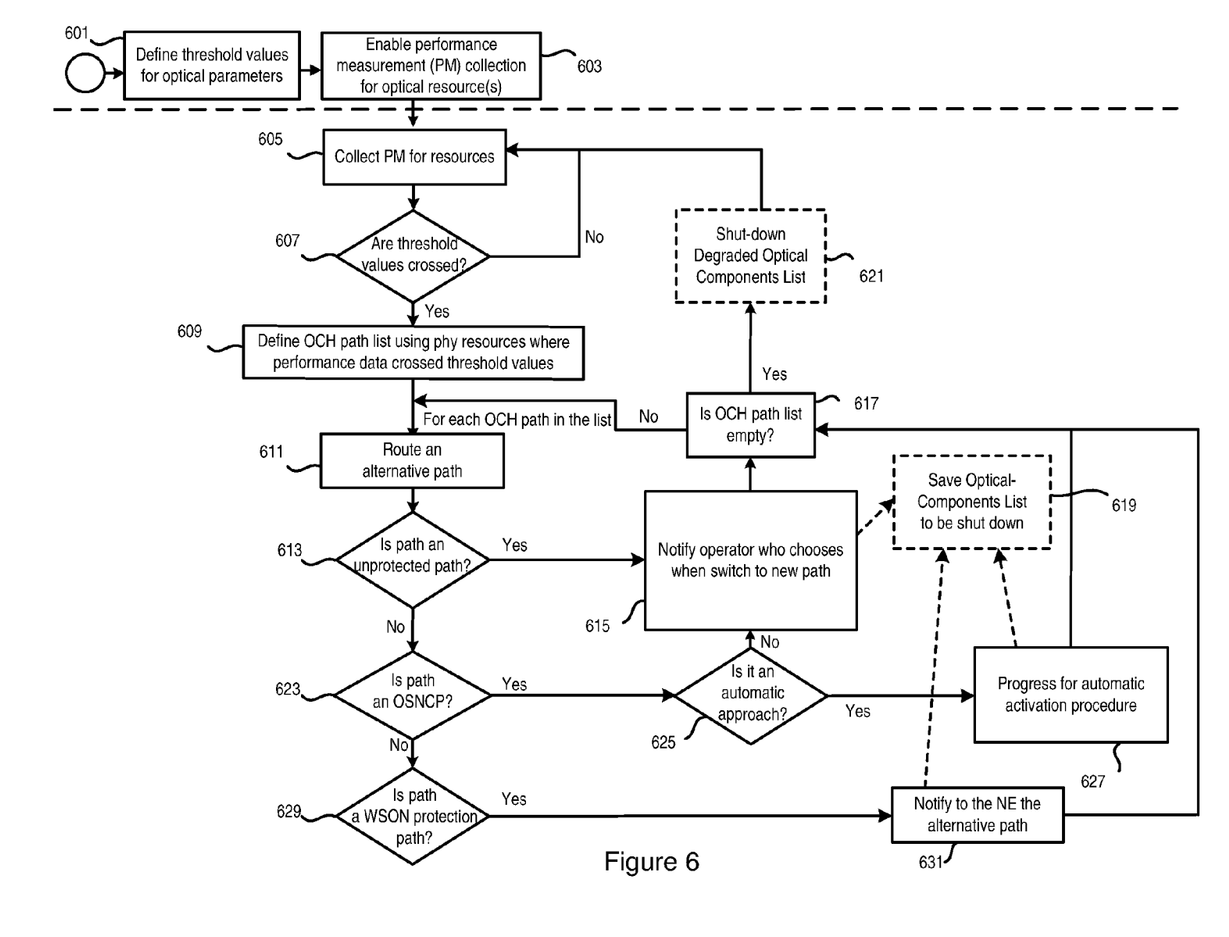
FIG. 6 shows the steps performed by another embodiment of the present invention.

FIG. 6 shows in further detail the steps performed by another embodiment of the invention. The method of FIG. 6 describes the steps that may be performed by a network management system which is configured to handle unprotected paths, optical sub-network connection protection (OSNCP) paths, and wavelength switched optical network (WSON) protected paths. It is noted that any one or more of these paths may be used, or other types of paths not listed.

The steps shown above the dotted line relate to steps that can be performed during an initial set-up phase, for example a one-off operation. Alternatively, these steps can be performed dynamically during operation, for example if a service-level-agreement changes.

In step 601 the threshold value (or values) for an optical parameter (or parameters) are defined. This may involve setting a threshold value for one or more key optical parameters. The threshold values can be configured by an operator, for example taking into consideration a service-level-agreement (SLA) which has been agreed with the customers of the operator. As such, the level of resilience for critical paths can be increased for high priority customers.

In step 603 performance measurement (PM) collection is enabled for one or more network resources (for example nodes such as amplifier units, transponders, regenerators, multiplexers, etc.). According to one embodiment this can involve enabling the collection of performance measurements from all of the resources in a network. Alternatively, the collection of performance measurement can be enabled for fewer resources in the network, for example only key resources.

In step 605 the performance measurements are collected or received from the resources. In step 607 the collected performance measurements are compared with threshold values, to determine if any threshold values have been crossed. If not, this monitoring operation in step 607 continues, for example by periodically comparing performance measurements with threshold values. The periodicity of the collection can be set to any value by an operator depending on a given application, for example collected each 24 hours. The comparison can involve comparing operating parameters of optical devices, such as laser devices, with respective threshold values to determine whether the operating status of an optical device has changed. It is noted that the comparison may also be performed on a dynamic basis, for example whereby the performance measurements are continuously compared with threshold values, rather than on a periodic basis.

If it is detected in step 607 that a performance measurement has crossed a threshold value, an optical channel path list is defined using the network resources where the performance data has crossed threshold values, step 609. This may comprise a list of paths that have a defect, sub-optimal or underperforming resource along the path. As such, it is possible to automatically define a list of optical channel (OCH) paths that are using resources where optical performance has crossed a threshold value.

In step 611, for each OCH path in the list an alternative path is calculated. The following steps define the options that may be taken depending upon which type of path is listed as comprising a resource having a performance measurement that has crossed a threshold.

For example, in step 613 it is determined whether a path is an unprotected path. In the case of an unprotected path, the network management system can inform an operator of the issue and propose an alternative protecting path that the operator can activate, at a time chosen by the operator, step 615. As such, for unprotected paths an operator has control over when the system changes to a new path.

The network management system then determines whether there are any other paths listed in the OCH path list, step 617. If so, steps 611 and 613 are repeated. If not, the network management system returns to collect new performance measurements for the resources in the network, step 605.

According to one embodiment, step 619 relates to a step of storing a list of optical components that are to be shut down. For example this list can be created from the list of optical components whose performance measurements have crossed a particular threshold. In such an embodiment, action can be taken to shut down such optical components at an appropriate time, such as in step 621 before commencing to collect new performance measurements. It is noted that the shut-down operation can be performed at another time if desired. In addition, the optical components to be shut-down can be shut-down together, or in some other ordered manner.

If it is determined in step 613 that the path is not an unprotected path, step 623 determines whether the path is an OSNCP path. If so, it is determined in step 625 whether an automatic approach or a semi-automatic approach is being adopted. If using an automatic approach, an automatic activation procedure is carried out in step 627, whereby an alternative path is automatically used instead of the existing path. This can involve automatically changing a working/protection path involving the monitored optical parameter, with a new path that has been computed. If an automatic approach is chosen, it is therefore possible to define an automatic procedure in order to substitute the old paths with the new ones.

If it is determined in step 625 that a semi-automatic approach is being adopted, processing moves to step 615. In step 615 an operator is informed of the issue, such that the operator can activate an alternative path at a time chosen by the operator.

In either case, the network management system then determines whether there are any other paths listed in the OCH path list, step 617. If so, steps 611, 613, etc. are repeated. If not, the network management system returns to collect new performance measurements for the resources in the network, step 605. As above, in an embodiment that stores a list of optical components that are to be shut down, step 619 is performed. In such an embodiment action is taken to shut down such optical components at an appropriate time, for example in step 621 before commencing to collect new performance measurements.

If it is determined in step 623 that the path is not an OSNCP path, it is determined in step 629 whether the path is a wavelength switched optical network (WSON) protection path (managed by a control plane). If so, the network management system can automatically notify a network element (NE) of an alternative path, step 631. The network elements can then manage the new path as a new pre-planned path, forcing the switching on the new pre-planned path. In other words, if an automatic approach is chosen, new paths can be sent to WSON NEs in order to update old pre-planned paths with the new ones. Although not shown, it is noted that a semi-automatic approach may also be provided for a WSON path, whereby a choice between automatic and semi-automatic operation is provided between steps 629 and 631.

The network management system then determines whether there are any other paths listed in the OCH path list, step 617. If so, steps 611 and 613, etc. are repeated. If not, the network management system returns to collect new performance measurements for the resources in the network, step 605. As above, in an embodiment that stores a list of optical components that are to be shut down, step 619 is performed. In such an embodiment action is taken to shut down such optical components at an appropriate time, for example in step 621 before commencing to collect new performance measurements.

It can be seen from the embodiment above that an automatic or a semi-automatic approach can be applied to all the three cases. However, in the presence of unprotected paths, a semi-automatic approach is preferred so that an operator can select the best time to progress, since the activation of a new computed path can have an impact on traffic being lost.

It is noted that the order in which the network management system determines which path is applicable (i.e. steps 613, 623, 629) can be changed, without departing from the scope of the invention as defined in the appended claims.

In all the above cases, it can be seen that the network management system can opt to shut down the identified degraded optical components as soon as the traffic has been removed from them.

The methods described above enable the performance monitoring of some key parameters on the laser units of amplifier and transponder units, for example, to be carried out.

The embodiments of the invention add intelligence to a network management system, enabling the network management system to react to performance data collected from various nodes or resources in the case of a DWDM network.

The embodiments of the invention increase the network availability when considering the current and forecast DWDM/OTN network use, and they can provide a large number of end-to-end customer services types.

The performance data monitoring can also be used to provide data that is able to anticipate or predict faults in the network. For example, by detecting that an operating parameter has crossed a particular threshold, this enables an optical device or node to be shut-down in a planned manner as described in the embodiments above, rather than having to reconfigure or recomputed a path after an optical device has failed unexpectedly.

As such, according to one embodiment, the performance monitoring can be targeted or focused on critical devices, such as critical optical amplifier/transponder/regenerator devices, involving one or more OCH paths, and therefore a large number of end-to-end customer services. The embodiments of the invention therefore have the advantage of predicting and preventing unexpected faults on an optical component, which would otherwise have an undesirable effect on a large number of end-to-end customer services.

The approach covered by the embodiments can prevent the fault and therefore prevent the management of critical issues for the operators, that would otherwise risk failing service-level-agreements with end-to-end customers.

The embodiments of the invention also have the advantage of preventing path computation engines from becoming overloaded, as the computation of the new routes anticipates the faults. This means that a new path can be computed in relative ease, rather than a time critical on-the-fly approach with systems which simply react to faulty devices. This means that new paths can be computed without overloading, even if a number of optical channel paths need to be re-computed.

The embodiments of the invention are also relevant for sustainability as obsolete optical components will not be used anymore and, in general, can help to identify aged optical components when performance decreases, such that they can be substituted. This in turn has the advantage of decreasing the overall optical network power consumption, since inefficient optical devices will be removed from the network.

As noted above, a threshold value may comprise multiple threshold levels, the multiple threshold levels providing multiple status levels for the optical parameter of a node.

It is noted that the collection or monitoring of operating parameters may be made in a plurality of nodes in a network, all of the nodes, or just key nodes. For example, the detection of laser aging by measuring deviations in the bias current, temperature or other parameter of a laser device can be used on a plurality of nodes, or on all nodes, involved in the optical paths.

It is also noted that any method of calculating a new path by a path computation engine is intended to be embraced by embodiments of the present invention.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method for optimizing the configuration of an optical network which is adapted to transport optical traffic along a path from a source node to a destination node, wherein the path can be routed via any one or more of a plurality of intermediate nodes in the optical network, the method comprising the steps of:
   receiving an operating parameter of an optical device monitored in one of a plurality of nodes;
   comparing the received operating parameter with a threshold value;
   determining an operating status of an operating node along the path from the source node to the destination node based on the comparison of the received operating parameter with the threshold value; and
   using the determined operating status of a node as a routing criteria for computing a path for routing traffic through the optical network.

2. A method as claimed in claim 1, wherein the step of receiving an operating parameter comprises the step of receiving an operating parameter relating to the performance of a laser device in a node.

3. A method as claimed in claim 2, wherein the received operating parameter relating to the performance of a laser device comprises any one or more of:
   a bias current of the laser device;
   a temperature of the laser device;
   the power consumption of the laser device
   the peak current used by the laser device; or
   the average current used by the laser device.

4. A method as claimed in claim 1, wherein the steps of receiving and comparing are performed periodically in order to detect a change in the operating status of a node.

5. A method as claimed in claim 4, wherein the detection of a change in the operating status of a node is used to trigger a reconfiguration of a path in the optical network.

6. A method as claimed in claim 4, further comprising the step of triggering a node to be removed from the optical network, in response to detecting a change in the operating status of the node.

7. A method as claimed in claim 4, further comprising the step of reconfiguring the optical network in response to detecting a change in the operating status of a node.

8. A method as claimed in claim 5, wherein the steps of triggering a reconfiguration, removing a node or reconfiguring the optical network are performed either automatically or semi-automatically.

9. A method as claimed in claim 1, wherein the path is an unprotected path, and further comprising the steps of:
informing an operator of the network that the operating status of a node has changed; and
proposing one or more alternative paths for the operator to select.

10. A method as claimed in claim 1, wherein the path is a protection path of a path protection mechanism.

11. A method as claimed in claim 10, wherein the path is an optical sub-network connection protection (OSNCP) path, and further comprising the step of changing a working path and/or protecting path involving a node where the operating status has changed.

12. A method as claimed in claim 10, wherein the path is a wavelength switched optical network (WSON) protected path, and further comprising the steps of:
notifying network elements that the operating status of a node has changed;
proposing one or more alternative paths; and
allowing the network elements to manage a new path for the optical traffic.

13. A path computation engine for an optical network adapted to transport optical traffic along a path from a source node to a destination node, the path computation engine comprising:
a receiving unit for receiving a plurality of operating parameters relating to optical devices in nodes of the optical network; and
a processing unit adapted to:
compare a received operating parameter with a respective threshold value;
determine an operating status of an operating node along the path from the source node to the destination node based on the comparison of the operating parameter with the respective threshold value; and
compute a path for routing traffic through the optical network based on the determined operating status of the nodes.

14. A network management node for an optical network comprising a plurality of nodes adapted to transport optical traffic along a path from a source node to a destination node, the network management node comprising:
a receiving unit for receiving a plurality of operating parameters relating to optical devices in the plurality of nodes; and
a processing unit adapted to:
compare the received operating parameters with respective threshold values;
determine the operating status of the plurality of operating nodes along the path from the source node to the destination node based on the comparison of the operating parameters with the respective threshold values; and
configure the optical network based on the determined operating status of the nodes.

\* \* \* \* \*